Sept. 29, 1931.  R. W. JUDSON  1,825,402

VIBRATION DAMPER

Filed April 18, 1927

INVENTOR.
ROSS W. JUDSON
BY W. W. Harris
ATTORNEY.

Patented Sept. 29, 1931

1,825,402

UNITED STATES PATENT OFFICE

ROSS W. JUDSON, OF DETROIT, MICHIGAN, ASSIGNOR TO CONTINENTAL MOTORS CORPORATION, OF DETROIT, MICHIGAN, A CORPORATION OF VIRGINIA

VIBRATION DAMPER

Application filed April 18, 1927. Serial No. 184,752.

This invention relates to internal combustion engines and particularly to the construction of vibration dampers therefor.

One of the objects of my invention resides in providing a vibration damper of simple construction capable of manufacture in quantities and at a relatively low cost.

Internal combustion engines used for propelling motor vehicles are generally provided with a main flywheel at one end of the crankshaft, usually the rear end, known to be insufficient to prevent vibrations particularly of a torsional character, in the crankshaft. The existence of these objectionable vibrations is well known and are usually dampened by providing a relatively small auxiliary flywheel at the front end of the crankshaft, commonly known as the Lanchester Damper, this flywheel having a friction slip connection with the crankshaft whereby tendencies toward vibration will be dampened. In practice this type of device is objectionable in that the friction surfaces wear or become oil soaked and thus lose their desired effect.

My invention provides an auxiliary flywheel construction for the front end of the crankshaft wherein the usual friction slip connection is eliminated, my construction not requiring periodic adjustment after assembly. I have found that in operation my damper construction will effectively dampen the objectionable vibrations, the construction being simple and easily assembled, highly desirable and much sought features from the standpoint of quantity manufacture.

Further objects of my invention reside in the novel combination and arrangement of parts as will be apparent as the description progresses.

Figure 2:
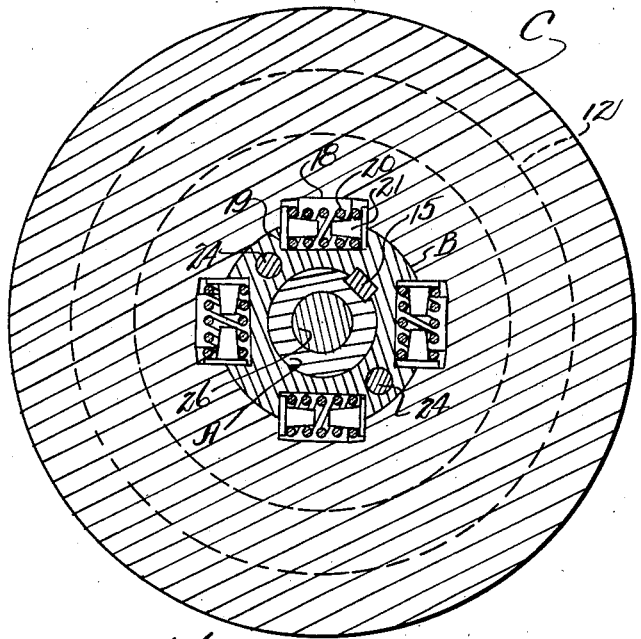
Figure 1:
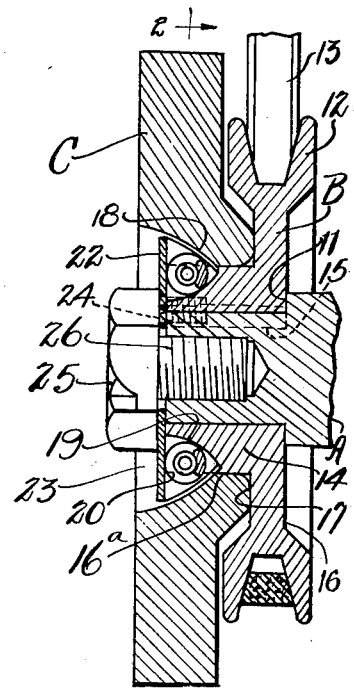
Figure 3:
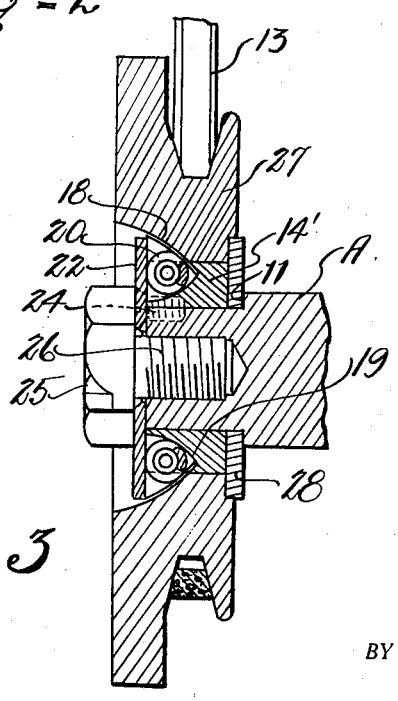

In the accompanying drawings in which like reference characters indicate corresponding parts, Fig. 1 is a sectional view of my damper construction, Fig. 2, is a section through 2—2 of Fig. 1, and Fig. 3 illustrates a modified form of my invention.

In the drawings reference character A represents the forward end of the usual crankshaft for a multi-cylinder internal combustion engine, the rear end being provided with the usual main flywheel (not shown). The crankshaft is reduced at its forward end to provide a shoulder 11. In Figs. 1 and 2, B is the inner pulley member formed with a pulley 12 adapted to drive a belt 13 running to the usual fan (not shown) or other device associated with the engine. The pulley member B is formed with a hub 14 surrounding the crankshaft end and keyed thereto at 15. The rear face 16 of the hub 14 engages the shoulder 11 conveniently limiting rearward movement of the pulley member and serving to quickly locate the desired position of the pulley member in assembling the damper. Positioned on the hub 14 is the outer flywheel or inertia member C having a face 16$^a$ bearing on the hub 14 and a face 17 engageable with the front face of the pulley B serving to locate the inertia member and limit its rearward movement. The inertia and pulley members are provided at a suitable point or preferably at circumferentially spaced intervals with complementary pocket portions 18 and 19 respectively. Within each pocket is located a coil spring 20 having its opposite ends centered by elements 21 acting on both the pulley and inertia members. A washer 22 cooperates with the pockets to entirely house the springs, this washer being preferably located rearwardly of the front face of the inertia member C within the cut out portion 23 of the inertia member where the spring pocket is protected from dust, water, and other foreign matter. The washer 22 extends outwardly closely adjacent the under face of the flywheel recess 23 whereby forward movement of the flywheel after assembly is prevented. The washer 22 preferably engages the front face of the pulley hub 14 and may also engage the front face of the crankshaft end, being secured by set screws 24 to one of these parts preferably the pulley hub 14 as shown in Figs. 1 and 2. The usual starter element 25 for engagement by a hand crank may be provided, being secured to the crankshaft as by threaded shank 26.

In normal operation the flywheel or inertia element C will be driven from the pulley B keyed to the crankshaft at the same angular velocity as these driving parts by reason of springs 20, the flywheel C being otherwise freely rotatively movable relative to the crankshaft. However when the crankshaft tends to set up the objectionable vibrations at the various periods, then springs 20 will yield sufficiently to dampen the vibrations, preventing the crankshaft from vibrating at its otherwise critical speeds. The flywheel C will furnish the necessary inertia to exercise the drag or resistance to vibration for the crankshaft. I have found that the objectionable vibrations may be satisfactorily dampened by my improvement, the stiffness of springs 20 and moment of inertia of the flywheel being relatively proportioned to suit any particular motor. These factors are easily determined for any engine, the mass of the flywheel and the spring stiffness being either or both increased or decreased as will be readily understood. Once determined for any engine these values will of course remain constant for all such engines.

It will be apparent that I have provided a damper of simple construction, easily assembled, and requiring practically no adjustment for wear. The damper is also compactly arranged to include closely nested pulley and inertia members.

In Fig. 3 the pulley and inertia members are combined into one structural inertia element 27 being driven as before by a driving hub portion 14' keyed to the crankshaft. Rear washer 28 engages shoulder 11 and limits rearward movement of the driving hub 14' and inertia pulley member 27. The construction and operation is otherwise as described in connection with Figs. 1 and 2.

What I claim as my invention is:

1. A vibration damper adapted to be located on the forward end of the crankshaft of an internal combustion engine and for use in conjunction with the usual main flywheel located on the rear end of the crankshaft for damping crankshaft torsional vibrations, said damper comprising a driving element fixed to the forward end of the crankshaft, a flywheel element coaxial with the crankshaft and relatively rotatable thereto, a spring constituting a driving connection between the driving element and flywheel element constructed and arranged in conjunction with the flywheel element so that under normal engine running conditions the flywheel element will be driven from the crankshaft at the same angular velocity therewith and so that yielding of the spring is produced under conditions of torsional vibration in the crankshaft, said elements being provided with complementary pocket portions receiving said spring, and a washer cooperating with the pocket portion to enclose the spring.

2. A vibration damper adapted to be located on the forward end of the crankshaft of an internal combustion engine and for use in conjunction with the usual main flywheel located on the rear end of the crankshaft for damping crankshaft torsional vibrations, said damper comprising a driving element fixed to the forward end of the crankshaft, a flywheel element coaxial with the crankshaft and relatively rotatable thereto, a spring constituting a driving connection between the driving element and flywheel element constructed and arranged in conjunction with the flywheel element so that under normal engine running conditions the flywheel element will be driven from the crankshaft at the same angular velocity therewith and so that yielding of the spring is produced under conditions of torsional vibration in the crankshaft, said elements being provided with complementary pocket portions receiving said spring, and a washer cooperating with the pocket portion to enclose the spring, said washer being located rearward of the forward face of the flywheel element.

3. A vibration damper for internal combustion engines comprising a driving element fixed to the engine crankshaft, a flywheel element mounted on said driving element concentric with the crankshaft, said elements formed with complementary portions forming a pocket, a spring in said pocket constituting a yielding driving connection between the driving and flywheel elements, and a member cooperating with said pocket to house the spring and providing an abutment limiting axial movement of the flywheel element.

4. A vibration damper for internal combustion engines comprising an inner driving element and an inertia element, the driving element being fixed to the engine crankshaft and the inertia element being rotatable relatively to the crankshaft and driving element, spaced pairs of complementary portions forming pockets in the driving and inertia elements, springs within said pockets constituting a yielding driving connection between said elements, said inertia element having a face provided with a concave portion communicating with the flywheel pocket forming portions, a washer within said concave portion serving to house the springs in their respective pockets, and means for securing said washer in position.

In witness whereof, I hereunto subscribe my name this 15 day of April, A. D. 1927.

ROSS W. JUDSON.